Jan. 8, 1935. I. KITROSER 1,987,113
APPARATUS FOR ELIMINATING MOIRÉ EFFECTS
Original Filed July 31, 1929
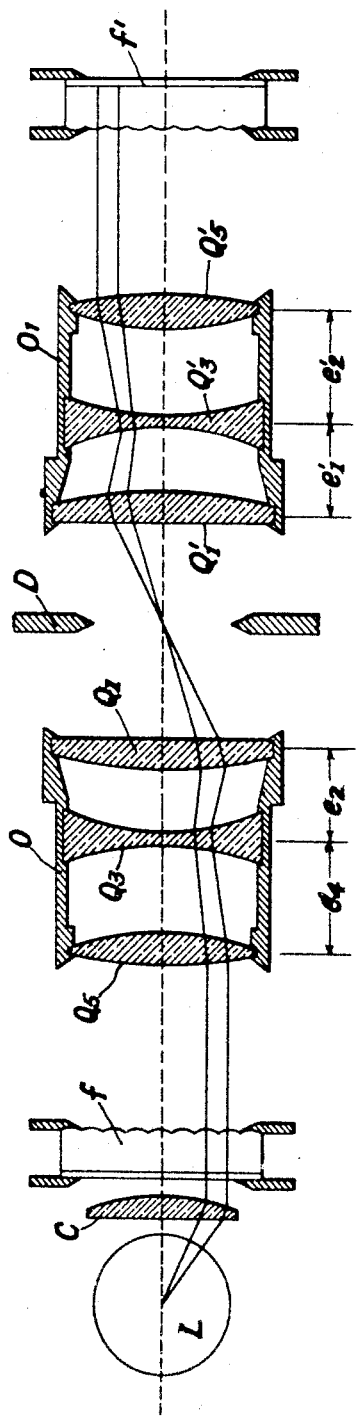
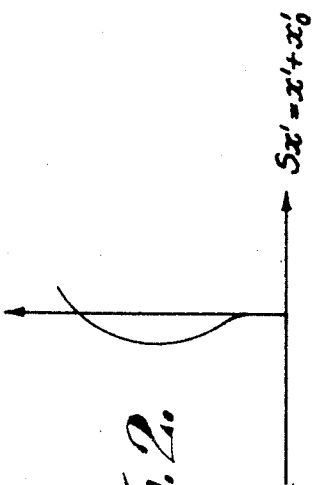
INVENTOR
Isaac Kitroser
BY
Arthur Wright
ATTORNEY Patented Jan. 8, 1935

1,987,113

UNITED STATES PATENT OFFICE 1,987,113

APPARATUS FOR ELIMINATING MOIRÉ EFFECTS

Isaac Kitroser, Paris, France, assignor to Keller-Dorian Colorfilm Corporation, New York, N. Y., a corporation of Delaware Original application July 31, 1929, Serial No. 382,381. Divided and this application August 17, 1932, Serial No. 629,107. In Germany April 3, 1929

10 Claims. (Cl. 88—24)

This is a divisional application of my application, Ser. No. 382,381, filed July 31, 1929, upon Method and apparatus for causing the reticulation and cloudy effects in goffered films in colors to disappear.

In the French Patent No. 571,096, of December 4, 1922, there is described a method and apparatus for eliminating cloudy effects during reproduction and reticulation apparent during projection with goffered films by means of refracting microscpic elements.

There is pointed out in the above mentioned patent the conditions which the reproducing objective must fulfill in order that the cloudy effects do not become manifest during reproduction. It is shown therein that in order to cause the cloudy effects to disappear the engraving must be such that each lenticular element is smaller than the definition of the reproducing objective.

According to my present invention I start with a given goffering and I modify the construction of the reproducing objective, this being done in such a way that the definition thereof will be substantially the diameter of the imposed lenticular elements.

For this purpose I may adopt an optical arrangement independent of the objective which gives the desired result. Now in order to cause the cloudy effects to disappear it is not sufficient to produce any sort of tone. The exact condition resides in the fact that the image of a luminous point infinitely small given by the reproducing objective must be in the nature of a luminous disk having a diameter substantially equal to the diameters of the lenticular elements, whether it be a question of picot goffering with spherical diopters or line goffering with cylindrical diopters. The said luminous impression must have a distribution of light which is absolutely uniform and the tone must be the same throughout the extent of the image reproduced.

For this purpose I have devised an apparatus which possesses the property of giving good images while at the same time provides a tone which satisfies the conditions above pointed out.

The invention will be more readily understood in the following description when taken in connection with the accompanying drawing forming part of this specification and in which—

Fig. 1 is a diagrammatic sectional view illustrating my apparatus in a conventional way, as shown in said parent application; and Fig. 2 is a diagram of a curve.

As illustrating the general nature of the present invention as obtained from the said parent application, and referring to the drawing more in detail, D represents a diaphragm and O, O' two identical parts of an objective symmetrically disposed on the opposite sides of said diaphragm. The part O consists of a bi-convex lens $Q_5$, a biconcave lens $Q_3$ and a plano-convex lens $Q_1$. The part O' is comprised of lenses $Q'_5$, $Q'_3$ and $Q'_1$ identical to the lenses $Q_5$, $Q_3$ and $Q_1$. The end lenses of part O are disposed respectively at distances $e_4$ and $e_2$ from the central lens and the lenses of member O' are disposed in similar fashion at the respective distances $e'_4$ and $e'_2$.

At $f$ is indicated the original goffered film and at $f'$ the goffered virgin film.

L represents a source of light and C a condenser therefor.

With my objective I can correct all aberration and at the same time give the proper value to the spherical aberration curve. In fact, my objective being symmetrical and of unity magnifying power, chromatic enlarging aberration, coma and distortion are corrected automatically due to the lenses being symmetrical.

By employing calculations involving standard formula the various quantities as well as the distances $e_2$, $e'_2$ respectively for which the definition given by the objective will be substantially equal to the dimension of the elements of the goffering.

Thus, according to the classical well known formulæ, if $M_1$, $M_3$ and $M_5$ represent the inverse of the focal lengths of the objectives $Q_1$, $Q_3$ and $Q_5$, respectively, per lens; $n_1$, $n_3$ and $n_5$ the indices of refraction; $V_1$, $V_3$ and $V_5$ the constringencies or dispersion, respectively; $h_1$, $h_2$ and $h_3$ the height of incidence, the following formulæ may be used to calculate the power of the lenses in order to correct the objective for chromatic aberration of position and the Petzwal curve for a unity focus of the objective.

$$M_1 + h_3 M_3 + h_5 M_5 = 1 \ (\text{focus} = 1)$$

where $$M_1 = \frac{1}{F_1}, \quad M_3 = \frac{1}{f_3} \quad e_2 = \frac{1-h_3}{M_1} \quad e_4 = \frac{h_3-h_5}{M_1+h_3\ M_3}$$

$$\frac{M_1}{V_1} + h_3^2 \frac{M_3}{V_3} + h_5^2 \frac{M_5}{V_5} = O \ (\text{Chromatic aberration})$$

$$\frac{M_1}{n_1} + \frac{M_3}{n_3} + \frac{M_5}{n_5} = P \ (\text{Petzwal curve})$$

The powers calculated from the foregoing will therefore correspond to any fixed value of $e_2$ and $e_4$ and $e'_1$ and $e'_2$.

I am thus able to correct for spherical and astigmatic aberration at will by means of the three curvatures, given the three optical members.

Spherical aberration thus corrected is represented in the form of a curve in Fig. 2 which will be readily recognized by those skilled in the art. The area represented by this curve depends essentially on the distance $e_2$ or rather the distance $h_3$. As shown in Fig. 2 the ordinate is represented by the height of intersection of the incident ray with the entry pupil or abscissa aberration.

I have observed that if $h_3$ increases, that is if a correction for spherical aberration, Fig. 2, is to be obtained, $S_2$ (2nd. sum of Zeidel) according to the well known classical formulæ, must be increased or decreased. If $h_3$ decreases, then the exact opposite is true. Now the clearness or definition of the image of the objective, as corrected, depends upon the aforementioned aberration area which changes with the magnitude of the 2nd sum of Zeidel. I calculate the objective, I analyze the result, and if the aberration area is not suitable I start again calculating with another value of $e_2$. By making two or three calculations I am able to interpolate and obtain the true distance of $e_2$ for which $S_2$ is such that the decree of indefinition given by the objective is substantially equal to the dimensions of the lenticular elements of the goffered film.

If the reproduction is to take place with an original and a virgin film having different goffering, I establish a degree of indefinition substantially equal to the smallest of the lenticular elements of the two films.

Having thus described my invention, what I claim as new and desire to secure by Letters Patent is:

1. An apparatus for eliminating undesirable effects appearing during reproduction of goffered films comprising a diaphragm and a group of lenses, the definition of the lenses being such as to spread out the image free from optical aberrations, sufficiently to accurately eliminate said effects by an amount substantially equal to the width of a lenticle.

2. An apparatus for eliminating undesirable effects appearing during reproduction of goffered films comprising a diaphragm and a group of lenses, the definition of the lenses being such as to spread out the image free from optical aberrations, sufficiently to accurately eliminate said effects by an amount substantially equal to the width of a lenticle, whereby aberration, distortion and coma are eliminated in the spread out image.

3. An apparatus for eliminating undesirable effects appearing during reproduction of goffered films comprising a diaphragm and a group of lenses symmetrically disposed on the opposite sides of said diaphragm, the definition of the lenses, due to the adjustment of the respective positions thereof, being such as to spread out the image free from optical aberrations, sufficiently to accurately eliminate said effects by an amount substantially equal to the width of a lenticle.

4. An apparatus for eliminating undesirable effects appearing during reproduction of goffered films comprising a diaphragm and a group of lenses symmetrically disposed on the opposite sides of said diaphragm, the definition of the lenses, due to the adjustment of the respective positions thereof, being such as to spread out the image free from optical abberrations sufficiently to accurately eliminate said effects by an amount substantially equal to the width of a lenticle, whereby aberration, distortion and coma are eliminated in the spread out image.

5. A method for eliminating undesirable effects appearing during reproduction of goffered films, which comprises constructing and optically spreading by the indefinition of an objective the image of the film so that a point becomes enlarged into a curved outline and the image is spread out free from optical aberrations sufficiently to accurately eliminate said effects by an amount substantially equal to the width of a lenticle of a predetermined width.

6. A method for eliminating undesirable effects appearing during reproduction of goffered films, which comprises constructing and optically spreading by the indefinition of a symmetrical objective the image of the film so that a point becomes enlarged into a curved outline and the image is spread out free from optical aberrations sufficiently to accurately eliminate said effects by an amount substantially equal to the width of a lenticle of a predetermined width.

7. A method for eliminating undesirable effects appearing during reproduction of goffered films, which comprises constructing and optically spreading by the indefinition of an objective the image of the film so that a point becomes enlarged into a curved outline and the image is spread out free from optical aberrations sufficiently to accurately eliminate said effects, by an amount substantially equal to the width of a lenticle of a predetermined width whereby aberration, distortion and coma are eliminated in the spread out image.

8. A method for eliminating undesirable effects appearing during reproduction of goffered films, which comprises constructing and optically spreading by the indefinition of a symmetrical objective the images of the film so that a point becomes enlarged into a curved outline and the image is spread out free from optical aberrations sufficiently to accurately eliminate said effects, by an amount substantially equal to the width of a lenticle of a predetermined width whereby aberration, distortion and coma are eliminated in the spread out image.

9. A method for eliminating undesirable effects appearing during reproduction of goffered films, which comprises constructing and optically spreading by the indefinition of a symmetrical objective, due to the adjustment of the positions in the respective lenses therein, the images of the film so that a point becomes enlarged into a curved outline and the image is spread out free from optical aberrations sufficiently to accurately eliminate said effects by an amount substantially equal to the width of a lenticle of a predetermined width.

10. A method for eliminating undesirable effects appearing during reproduction of goffered films, which comprises constructing and optically spreading by the indefinition of a symmetrical objective, due to the adjustment of the positions in the respective lenses, therein, the images of the film so that a point becomes enlarged into a curved outline and the image is spread out free from optical aberrations sufficiently to accurately eliminate said effects, by an amount substantially equal to the width of a lenticle of a predetermined width whereby aberration, distortion and coma are eliminated in the spread out image.

ISAAC KITROSER.